US009352430B2

(12) United States Patent
Meierhans et al.

(10) Patent No.: US 9,352,430 B2
(45) Date of Patent: May 31, 2016

(54) CABLE GROMMET FITTING APPARATUS FOR CABLE

(71) Applicant: SCHLEUNIGER HOLDING AG, Thun (CH)

(72) Inventors: Ivo Meierhans, Lucerne (CH); Eugen Wosinski, Pfaeffikon (CH)

(73) Assignee: SCHLEUNIGER HOLDING AG, Thun (CH)

( * ) Notice: Subject to any disclaimer, the term of this patent is extended or adjusted under 35 U.S.C. 154(b) by 181 days.

(21) Appl. No.: 14/073,896

(22) Filed: Nov. 7, 2013

(65) Prior Publication Data
US 2014/0059849 A1 Mar. 6, 2014

Related U.S. Application Data

(63) Continuation-in-part of application No. 13/711,645, filed on Dec. 12, 2012, which is a continuation-in-part of application No. PCT/IB2011/052252, filed on May 24, 2011.

(60) Provisional application No. 61/723,359, filed on Nov. 7, 2012.

(30) Foreign Application Priority Data

Jun. 16, 2010 (EP) .................................... 10166167
Nov. 7, 2012 (EP) .................................... 12191626

(51) Int. Cl.
*B23P 19/00* (2006.01)
*B23P 19/08* (2006.01)
(Continued)

(52) U.S. Cl.
CPC ............... *B23P 19/084* (2013.01); *B65G 37/00* (2013.01); *H01R 43/005* (2013.01); *Y10T 29/53478* (2015.01)

(58) Field of Classification Search
CPC .... B23P 19/084; B65G 37/00; H01R 43/005; Y10T 29/53478
See application file for complete search history.

(56) References Cited

U.S. PATENT DOCUMENTS

| | | | | |
|---|---|---|---|---|
| 4,586,768 A | * | 5/1986 | Eck ..................... | H01R 13/6335 439/160 |
| 4,653,182 A | * | 3/1987 | Fukuda ................. | B23P 19/007 29/235 |

(Continued)

FOREIGN PATENT DOCUMENTS

| | | |
|---|---|---|
| CA | 2254017 A1 | 5/2000 |
| CA | 2254057 A1 | 5/2000 |

(Continued)

OTHER PUBLICATIONS

EPO search report and written opinion from priority EPO application EP12191626, dated Apr. 10, 2013, in German.
(Continued)

*Primary Examiner* — Carl Arbes
(74) *Attorney, Agent, or Firm* — George Kapsalas; Patentbuero Paul Rosenich AG

(57) ABSTRACT

Apparatus for separating out and conveying of cable sleeves for assembly of the separated cable sleeves onto cable. The included device relates to a bulk material container (3) accommodating plural loose cable sleeves, and a conveyor system (33) conveying the loose cable sleeves located in the bulk material container (3) to a separation and transportation system (39). A cross-sectional constriction (35) is provided in the transition passage (34) from the bulk material container (32) to the conveyor system (33).

20 Claims, 14 Drawing Sheets

(51) Int. Cl.
 *B65G 37/00* (2006.01)
 *H01R 43/00* (2006.01)

(56) References Cited

U.S. PATENT DOCUMENTS

| | | | | |
|---|---|---|---|---|
| 5,016,346 | A * | 5/1991 | Gerst | H01R 43/005 |
| | | | | 29/235 |
| 5,063,656 | A | 11/1991 | Hirano et al. | |
| 5,284,001 | A * | 2/1994 | Ochs | B65B 7/2835 |
| | | | | 53/307 |
| 5,315,757 | A | 5/1994 | Koch et al. | |
| 5,333,374 | A | 8/1994 | Pittau | |
| 5,392,505 | A * | 2/1995 | Harada | B23P 19/084 |
| | | | | 29/235 |
| 5,432,996 | A * | 7/1995 | Imgrut | H01R 43/005 |
| | | | | 29/235 |
| 5,465,478 | A | 11/1995 | Anderson et al. | |
| 5,732,750 | A | 3/1998 | Soriano | |
| 5,913,553 | A | 6/1999 | Takada | |
| 6,276,564 | B1 | 8/2001 | Reich | |
| 6,738,134 | B2 | 5/2004 | Maeda | |
| 6,763,574 | B1 | 7/2004 | Woll | |
| 6,990,730 | B2 | 1/2006 | Fujita et al. | |
| 7,047,618 | B2 * | 5/2006 | Hunter | B23P 19/084 |
| | | | | 29/229 |
| 7,363,703 | B2 * | 4/2008 | Imgrut | H01R 43/005 |
| | | | | 29/235 |
| 2005/0108872 | A1 | 5/2005 | Konrath et al. | |
| 2013/0104391 | A1 | 5/2013 | Wosinski | |

FOREIGN PATENT DOCUMENTS

| | | |
|---|---|---|
| DE | 19901439 C1 | 2/2000 |
| EP | 0462923 B1 | 12/1991 |
| EP | 0533045 A2 | 3/1993 |
| EP | 0533045 A3 | 7/1993 |
| EP | 0626738 B1 | 12/1997 |
| EP | 0881720 B1 | 9/2002 |
| EP | 1022821 B1 | 1/2004 |
| EP | 1912296 A1 | 4/2008 |
| EP | 1689049 B1 | 11/2008 |
| GB | 412859 A | 7/1934 |
| GB | 1379964 A | 1/1975 |
| JP | H05-227630 A | 9/1993 |
| JP | H09-171878 A | 6/1997 |
| JP | 2000-184542 A | 6/2000 |
| JP | 2004-014278 A | 1/2004 |
| JP | 2005-166297 A | 6/2005 |
| JP | 2009-042022 A | 2/2009 |
| WO | 2011/158145 A1 | 12/2011 |

OTHER PUBLICATIONS

EPO search report and written opinion from priority EPO application EP10166137, dated Oct. 12, 2010, in German.

International Search Report and written opinion, dated Aug. 29, 2011, from parent International Application PCT/IB2011/052252 published as WO2011/158145A1 on Dec. 22, 2011, with full English translation.

Copending commonly-owned U.S. Appl. No. 14/024,873, filed Sep. 12, 2013.

Aug. 25, 2015 Office Action in commonly-owned parent U.S. Appl. No. 13/711,645 by Wosinski et al. filed Nov. 7, 2013.

* cited by examiner

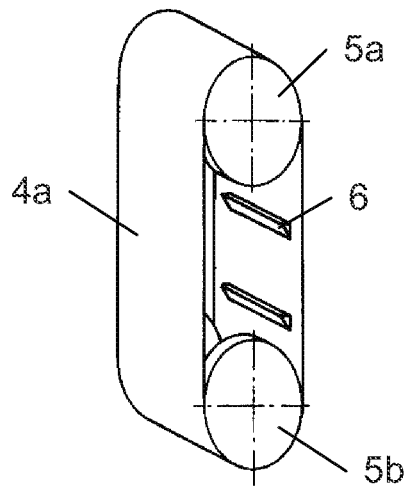
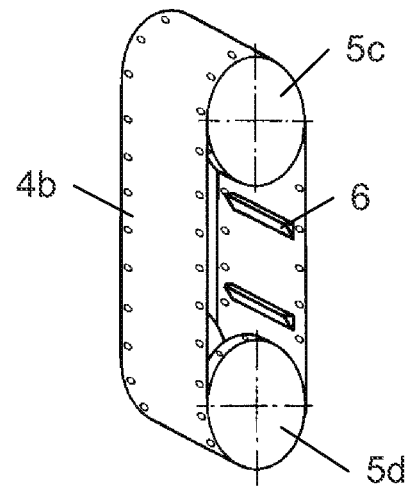
Fig. 5  Fig. 6
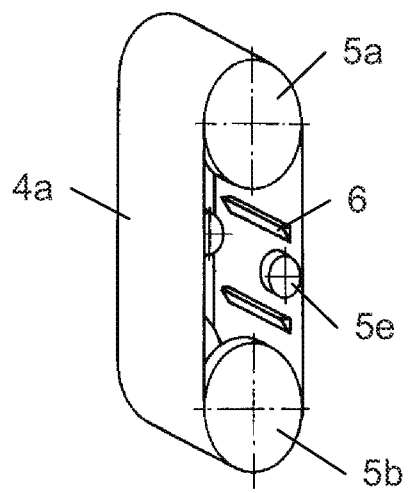
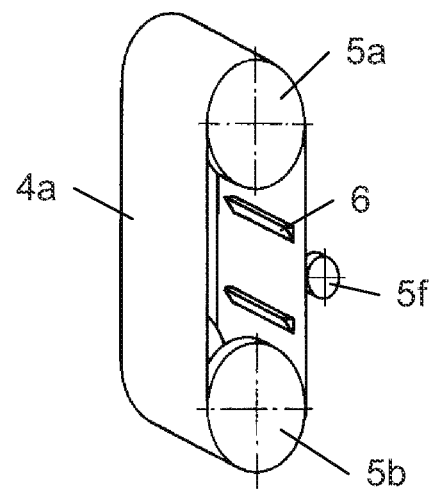
Fig. 7  Fig. 8

CABLE GROMMET FITTING APPARATUS FOR CABLE

This application claims benefit of priority to prior U.S. provisional application No. 61/723,359 filed on Nov. 7, 2012, and this application also claims benefit of priority to prior European application no. EP12191626 filed on Nov. 7, 2012, and this application is a Continuation-In-Part (CIP) of copending U.S. application Ser. No. 13/711,645 filed on Dec. 12, 2012 which is turn is a Continuation-In-Part (CIP) of prior PCT International application no. PCT/IB2011/052252 filed on May 24, 2011 and published as WO2011/158145A1 on Dec. 22, 2011, which in turn claims benefit of priority to prior European (EPO) application no. EP10166167 filed on Jun. 16, 2010, and the entireties of parent U.S. application Ser. No. 13/711,645 of parent PCT International application no. PCT/IB2011/052252 of European application no. EP12191626 and of U.S. application No. 61/723,359 are expressly incorporated herein by reference each in their entireties and as to all their parts, for all intents and purposes, all as if identically set forth in full herein.

The invention relates to an apparatus for fitting cable grommets onto a cable, including a loose material container holding a plurality of loose cable grommets/sleeves, a conveyor configured to separate the cable grommets located in the loose material container and to convey them to a mounting point, as well as a mounting device configured to mount the conveyed cable grommets onto the cable. The invention also relates to a device for separating out and conveying cable sleeves to an assembly tool for the purpose of assembly of the separated cable sleeves onto the cable. A bulk, loose material container accommodates plural loose cable sleeves, and a conveyor conveys the loose cable sleeves located in the bulk material container to a separation and transportation system.

In the manufacture of cables and/or cable harnesses, cable grommets (equivalently termed "sleeves") frequently must be fitted. In this case, the cable grommets are mounted on cable by a known mounting tool. In order to permit efficient production, both the cable and the cable grommets are continuously conveyed to the mounting location and/or the mounting tool. To accomplish this, a loose material container is conventionally filled with cable grommets to be processed, and from there the cable grommets may be removed as required. Certain separating devices are known from the prior art, these separating devices removing the cable grommets from the loose material container and supplying them to the mounting tool in an ordered manner, that is, in sequence.

For example, prior European patent EP1689049B1 discloses a device for fitting grommets to electrical cables. It consists of a base module for carrying both a grommet module and a grommet fitting module, the grommet module providing the grommets to be fitted in the correct position relative to the grommet fitting module, and the grommet fitting module fitting the cables with the grommets. In this example, the grommet module consisting of a grommet store and a conveying device is attachable to the base module in a pluggable manner.

A drawback with this prior solution is that the drum conveyer employed is relatively bulky, particularly if a long period of production is to be ensured without any refilling of the sleeve store. As a result, the machine for fitting the grommets requires a relatively large footprint.

In addition to the disclosure in EP1689049B1 for fitting grommets to electrical cables, devices are also known that have a suction-blowing conveyor for separating and conveying cable grommets. However, such conveyors are relatively noisy and require a comparatively large amount of energy for operation.

The present disclosure relates to provision of improved apparatus for fitting cable grommets onto a cable, in particular apparatus that is compact, quiet and energy-efficient. Advantages may be derived by providing an apparatus in which the conveying device includes:
  a continuous, annular conveyor protruding into the loose material container, as well as,
  a receiver for receiving the cable grommets, this receiver being arranged on the conveyor on the inside of an annular ring.

Compared to a prior suction-blowing conveyor, for example, the present separator has the advantage of considerably reduced noise development and considerably reduced energy consumption. Furthermore, when compared to the prior a drum conveyor, the present separator has the advantage of a considerably reduced space requirement. Accordingly, the present separator is particularly well-suited to a cable grommet fitting apparatus. Additional advantages of versions and developments of the invention shall be evident or revealed from the present description, in conjunction with the drawings.

It is advantageous if at least one roller is arranged on the inside of a ring formed by the conveyor, and around which roller the conveyor is guided. Advantageously, therefore, a frictional force may be kept low when the conveyor is moved. Additionally, the aforementioned roller may be provided as a counter-roller of a drive roller pressing onto the conveyor from the outside, so that the drive force is efficiently transmitted to the conveyor.

Advantageously, a plurality of rollers may be arranged on the inside of the ring formed by the conveyor, so that the conveyor is guided around these rollers, with at least two of the rollers being arranged on the inside of the ring formed by the conveyor and being vertically spaced apart. In this arrangement, a frictional force of conveyor movement may be reduced even further relative to the aforementioned variant.

Advantageously, at least one of these rollers may be driven and configured as a friction roller and/or as a friction wheel. The drive may be implemented particularly easily in this variant, as only one smooth and/or weakly structured conveyor and a smooth and/or weakly structured drive roller are required. Additionally, the drive roller is able to slip in the event of overload, so that damage to the drive motor or a gear mechanism located between the drive roller and the drive motor may be avoided.

It may also be further advantageous if at least one of the rollers be driven and configured as a spiked roller, spiked wheel and/or spiked cylinder or gearwheel. In this manner, a positive connection may be created with the conveyor. In this case, it may be advantageous that the contact forces of the roller on the conveyor are not required to be as high as with a friction wheel. Thus the mounting of the roller may be designed as less robust. Also, due to reduced bearing forces, smaller drive motors may be employed. With reduced contact forces, the risk of injury may also be reduced if an operator of the machine should inadvertently come between the conveyor and the drive roller. Additionally, via the positive connection a movement of the drive roller may be assigned directly and specifically to a movement of the conveyor. This provides advantages if a position of the conveyor is to be determined, for example, from the signal of a step motor or rotation sensor. It should also be mentioned that with a positive drive connection, a contamination of the drive roller or the belt, even oil contamination, is not as easily able to cause a malfunction of the machine.

In order to produce this positive drive connection, for example, the spikes of a spiked roller may engage in recesses in an annular conveyor, in a relation somewhat similar to that between a drive roller of a film projector and the recesses in film material. In this case, the spiked roller may be arranged inside, or even outside, the ring formed by the conveyor. Alternatively, the positive connection may also be produced by a gearwheel which engages in a toothed portion of the conveyor. To this end, such gearwheel may be at least partially configured in the manner of a toothed belt. The gearwheel may be arranged as the toothed portion of the conveyor inside, or even outside, the ring formed by the conveyor.

It may be particularly advantageous if:
instead of the at least one driven roller in engagement with the conveyor, a drive roller in engagement with a continuous, annular drive is provided, and,
the annular drive is at least partially in engagement with the conveyor on the outside of the conveyor ring.

In this manner, the drive is displaced on the side of the conveyor on which no grommet receivers are arranged, namely on the outside of the ring of the conveyor. However, high frictional forces may be transmitted in this manner. A positive connection between the drive roller and conveyor—albeit conceivable in principle—is generally not necessary. In this variant, the separating device may potentially be designed to be of simpler construction. For example, a narrow drive belt may be combined with a broader conveyor.

It may also be advantageous if a further roller is arranged relative to a driven roller in engagement with a conveyor, or relative to a drive roller engaged with a continuous, annular drive. In this manner, the contact pressure of a drive roller on the conveyor/drive may be increased and/or the conveyor/drive may be guided in an improved manner via the drive roller. The additional roller may, in this case, be either freewheeling or also driven.

It may also be particularly advantageous if the conveyor is guided in a rail, so that rollers arranged inside the ring formed by the conveyor, via which the conveyor is guided, may be dispensed with. In particular, when such rollers are eliminated, practically the entire width of the conveyor may be used for the grommet receiver, as a bearing surface for rollers does not need to be provided.

It may also be advantageous if a horizontal or oblique conveying portion that protrudes into the inside of the aforementioned ring is provided. In such variant, the cable grommets fall, in the region of the upper dead center point of the conveyor, onto the additional conveying portion and are transported thereby to the mounting point already in separated form. Advantageously, one or more of the group of: a conveyor belt, a slide, or a vibrator; are provided as this conveying portion. The conveying portion most suitable may be provided, depending on the type of cable grommets to be separated and the transport path to the mounting point.

It is also advantageous if one or more of the group of: a belt, strap, cable, or chain; are provided as the conveyor. Depending on the type of receivers that are fastened to the conveyor, and depending on the type of drive, the conveyor that appears most suitable may be provided in this variant.

It is also advantageous if one or more of the group of: a blade, fork, pin, or plate; are provided for grommet receiver. Depending on the type of cable sleeves to be separated, the receivers that appear most suitable may be provided in this variant.

It may be advantageous if the conveyor includes a belt of resilient plastics or rubber with blades made of plastic arranged thereon. It may be particularly advantageous in this case if the blades are adhesively bonded or riveted to the belt. In this manner, the belt may be produced in a simple manner and/or even a conventional belt actually originally intended for a different purpose may be arranged with the blades or plates. If the belt is of rubber or resilient plastics, it is additionally possible to compensate for tolerances of the belt or the mounting thereof.

The present disclosure may be understood to specify an improved device for a system attaching cable sleeves onto a cable. Particularly desirable would be a compact unit that nevertheless permits as long an operating period as possible without refilling. Refilling procedures should themselves be as simple and quick as possible, even when undertaken by untrained operating personnel. This may be achieved by a device providing a cross-sectional constriction in the transition region from the bulk container to the conveyor system. In this manner, even when the loose materials container is very full, any blockage or overload of the conveyor system may be avoided and a long period of production, free of malfunctions, may be ensured.

A transparent separator with an opening for the cable sleeves to pass through into the conveyor may be provided between bulk material container and conveyor.

The cross-sectional constriction, or opening, may be located beneath the maximum possible fill height of the cable sleeves in the bulk material container. In this manner, the highest possible fill level of the bulk material container to achieve a long period of production is ensured, without having to worry about a blockage or overload of the conveyor system. Furthermore, the cross-sectional constriction, or opening, may be located just above the floor of the bulk container. Here, the lower edge of the opening is preferably located on the floor of the container in order to enable complete emptying of the bulk material container in the course of production.

The bulk material container, with at least the conveyor, preferably also with the separation and transportation system, may form a structural unit.

Optimal flexibility and rapid refitting may be ensured in accordance with a further, optional feature, if the bulk material container is embodied as a separate component that can be coupled with the conveyor system. In this manner, a plurality of prefilled bulk material containers may be held ready, and empty containers may be rapidly and simply replaced with prefilled containers. Here, it may be of particular advantage if the opening is embodied such that it may be controllably closed.

The cross-sectional constriction may be combined with a conveyor system, that includes an endless loop-form conveyor and cable sleeve receivers for accommodating the cable sleeves, wherein these cable sleeve accommodators are arranged on the conveyor, on the inner face of the loop. Along with a low level of noise generation and energy consumption, this also enables a smaller build size.

In this regard, it is beneficial if at least one roller, around which the conveyor is guided, be arranged on the inner face of the loop formed by the conveyor. In this manner, frictional force during movement of the conveyor may advantageously be held lower. This roller may advantageously be provided as a counter-roller to a drive roller pressing externally onto the conveyor, so that the drive force may be well transferred onto the conveyor.

A horizontal or inclined section of the separation and transportation system may be provided to project into the interior of the conveyor loop. In this version, the conveyed cable sleeves fall in the region of the upper dead point of the conveyor. They fall onto the section of the separation and transportation system projecting into the conveyor system under this dead point, and they are transported by the latter in separated formation to the assembly station.

It should be understood that the previously indicated versions, variants, and developments of the invention may be combined in any manner as shall be readily understandable by readers ordinarily skilled in the art. It should be pointed out that the variants set forth only represent a proportion of the many possibilities for the invention and should not be used to limit the field of application of the invention. In the following detailed description with reference to the appended drawings, the description is elucidated in more detail with the aid of the examples of versions specified in the drawings figures.

In the figures the same and similar parts are provided with the same reference symbols, and functionally similar elements and features—insofar as this is not explained otherwise—are provided with the same reference symbols, but different indices. The appended reference labels list should be understood as a part of the disclosure. In the drawings:

FIG. 1—schematically depicts a simplified version of apparatus;

FIG. 2—depicts a practical embodiment of an apparatus, obliquely from the front;

FIG. 3—depicts the apparatus of FIG. 2, obliquely from the rear;

FIG. 4—depicts the apparatus of FIGS. 2 and 3, in side view;

FIG. 5—schematically depicts a represented conveyor belt driven via an internal drive roller;

FIG. 6—schematically depicts a perforated conveyor belt driven via one or more internal spiked roller;

FIG. 7—schematically depicts a conveyor belt driven via an internal additional roller;

FIG. 8—schematically depicts a conveyor belt driven via an external additional roller;

FIG. 9—schematically depicts a conveyor belt with an internal and external additional roller;

FIG. 10—depicts a sub-assembly of the apparatus according to the invention with a conveyor belt, obliquely from the rear;

FIG. 11—depicts the subassembly of FIG. 10, in side view;

FIG. 12—depicts the subassembly of FIGS. 10 and 11, in section;

FIG. 13—schematically depicts a conveyor belt driven via a sprocket arrangement, with blades provided as the grommet receivers and a guide rail;

FIG. 14—schematically depicts a conveyor belt driven by a drive roller and counter-roller arrangement;

FIG. 15—shows another version of a conveyor in form of a chain with grommet receiving plates each screwed to one of the elements of said chain; and, FIG. 16—schematically depicts a version with fork-shaped grommet receivers on a continuous belt conveyor.

By way of definition, it should be stated at this point that reference in this specification to "one version(variant)," "this version(variant)," or "the/a version(variant)," and the like, means that a particular feature, structure, or characteristic described in connection with the version or variant may be included in at least one version according to the disclosure. The appearances of phrases such as "in one version(variant)," in various places in the specification are not necessarily all referring to the same version or variant, nor are separate or alternative versions/variants mutually exclusive of other versions/variants. Moreover, various features are described which may be exhibited by some versions and not by others. Similarly, various requirements are described which may be requirements for some versions or variants but not other versions or variants. Additionally, the terms "connected" or "coupled" and related terms are generally used in an operational sense, as operative or operational, and are not necessarily limited to merely a direct connection or coupling. Furthermore, as used throughout this specification, the terms 'a', 'an', 'at least' do not denote a limitation of quantity, but rather denote the presence of at least one of the referenced item, and the term 'a plurality' should be understood to denote the presence of more than one referenced items. Finally, the terms "grommet," "sleeve," and "bushing," as may be used within the context of this entire disclosure and appended claims, all have identical meaning and connotation.

Figure 1:
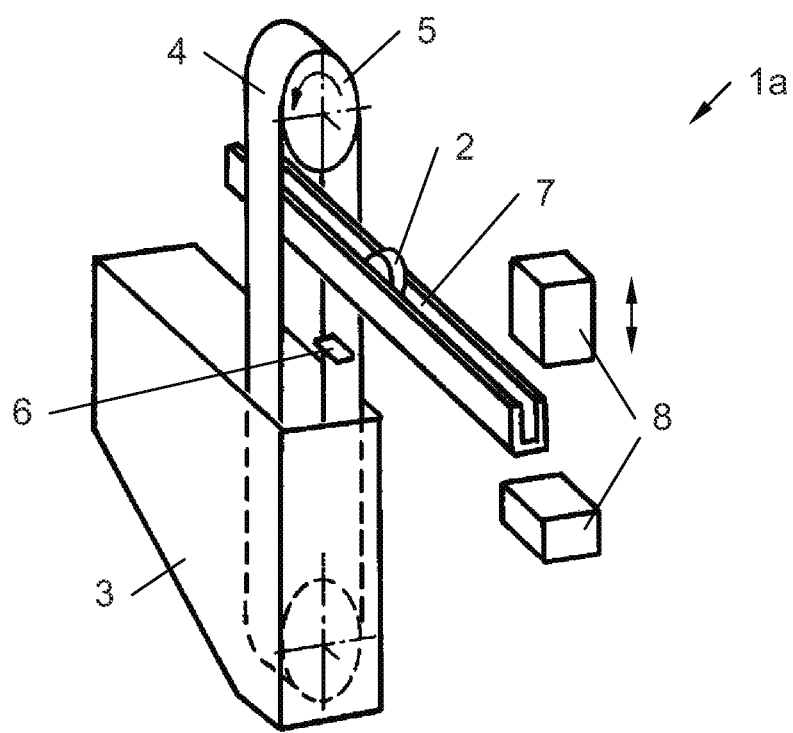

FIG. 1 schematically depicts a highly simplified version of a cable grommet fitting apparatus $1a$. The cable is not shown. The cable grommet fitting apparatus $1a$ includes a loose material container 3 that receives a plurality of loose cable grommets 2, and also includes a conveyor 4 to separate the cable grommets 2 located in the loose material container and to convey these separated cable grommets 2 towards a mounting location.

The apparatus as schematically depicted includes a continuous, annular conveyor 4, a plurality of rollers 5 around which the conveyor 4 is guided, grommet receivers 6 receiving the cable grommets 2, as well as a second conveyor, as slide 7 with conveying portion located slightly obliquely to the horizontal that protrudes inside the ring formed by the conveyor 4. The rollers 5 (in this case two in number) are arranged on the inside of the aforementioned ring and spaced vertically apart. In this case, at least one of the rollers 5 is driven. The grommet receivers 6 are arranged on the conveyor 4 on the inside of the ring. To this end, the rollers 5 have a recess so that the grommet receivers 6 are also able to move past the rollers 5. Naturally, additional guide rollers and/or drive rollers are also possible on the outside of the ring (see also FIGS. 5-9).

When the conveyor 4 is driven by the rollers 5, the grommet receivers 6 are moved through the loose material container 3 and at the same time pick up the cable grommets 2. These cable grommets 2 are lifted upwards, fall in the region of the upper dead center point of the conveyor 4 onto the slide 7, and roll forward to the mounting location. Here they are mounted onto a cable (not shown) by a grommet mounter 8. Naturally, it is also conceivable for the cable grommets 2 to be conveyed in a different position, for example lying flat, to the mounting tool 8.

Instead of the belt depicted here, for example also straps, cables or chains may be considered as the conveyor 4. Instead of the plates shown here, for example also blades, forks or pins may be considered as grommet receivers 6. Instead of the slide 7, which as depicted in the example of FIG. 1 may have a channel, for example a further conveyor belt or a vibrator surface may also be provided as the second conveyor.

Figure 2:
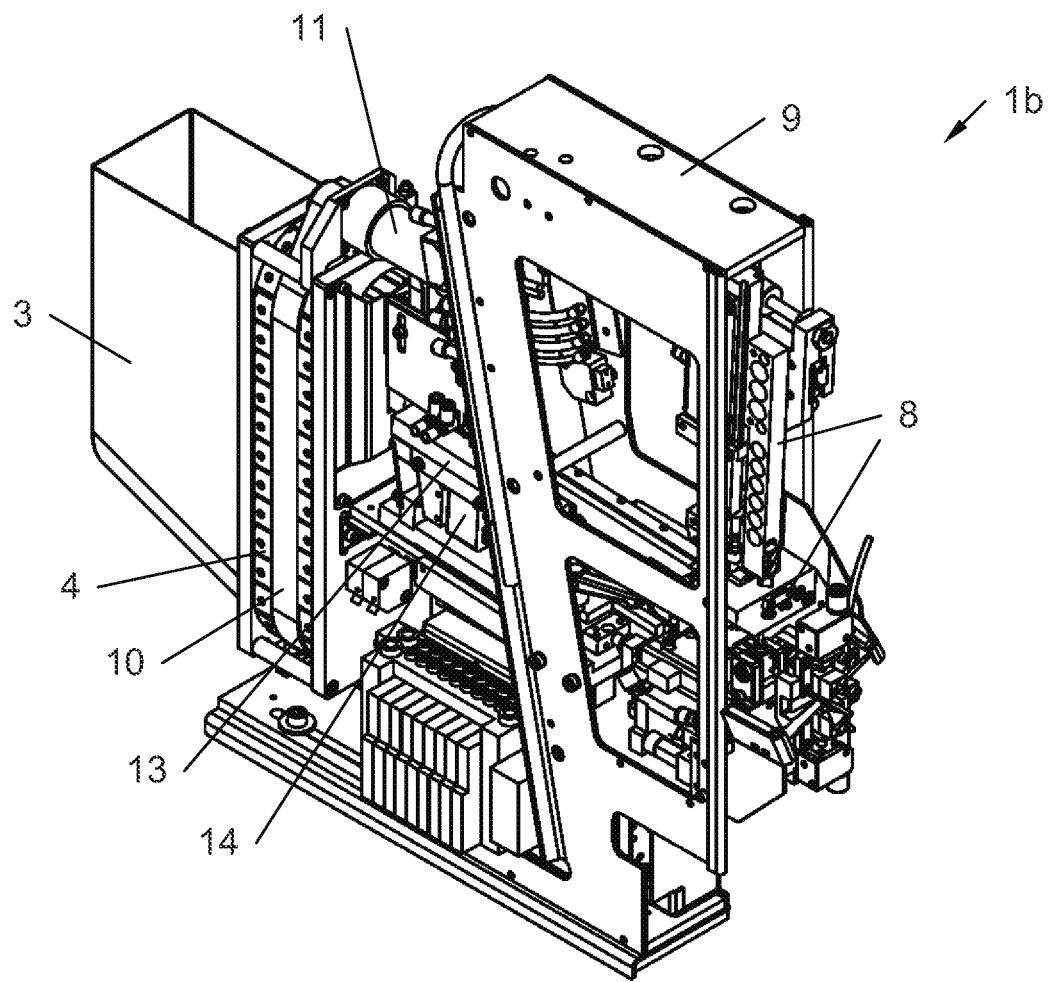
Figure 3:
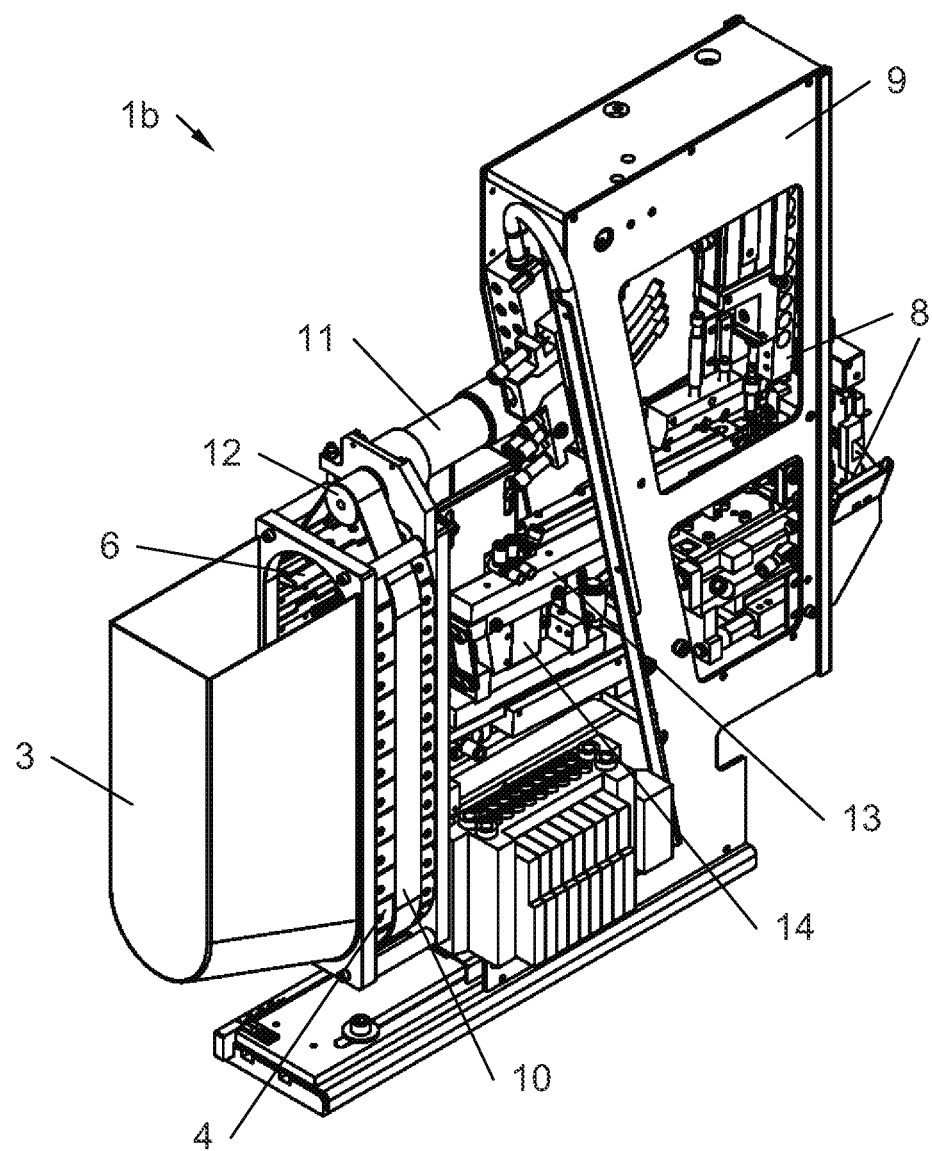

FIGS. 2 and 3 depict practical versions of apparatus $1b$ according to the invention obliquely from the front (FIG. 2) and obliquely from the rear (FIG. 3). The apparatus $1b$ includes a frame 9 and a mounting tool 8 attached therein. This grommet mounter 8 is known per se and need not be described in detail. The apparatus $1b$ further includes a loose material container 3 receiving a plurality of loose cable grommets 2, and a conveyor 4 in form of a conveyor chain $4d$ (FIG.

15) to separate the cable grommets 2 located in the loose material container 3, and to convey the separated cable grommets 2 to the mounting tool 8.

It should be understood that instead of the driven roller 5 depicted in FIG. 1 in engagement with the conveyor 4, FIGS. 2-3 depict a drive roller 12 in engagement with a continuous annular drive 10 and driven by a motor 11. In this example, a belt is provided as the drive 10. It is conceivable, however, to use for example a strap, a cable or a chain as the drive 10. The drive 10 is partially in engagement with the conveyor 4 on the outside of the annular ring formed by the conveyor 4. Grommet receivers 6 are attached to the inside of the conveyor 4. In a variant according to FIGS. 2-3, the conveyor 4 may be guided in a rail and not via rollers. In this case, the rail may be generally oval-shaped. Naturally, in such variants it is also conceivable for the conveyor 4 to be guided, as in FIG. 1, alternatively or additionally via rollers 5.

Furthermore, in this example, the previously-referred to horizontal or oblique conveying portion is an extent of a vibrator rail 13 as the second conveyor, this vibrator rail 13 positioned slightly obliquely relative to the horizontal and protruding inside the ring formed by the annular conveyor 4. The vibrator rail 13 is in this case driven by a vibrator motor 14, which sets the vibrator rail 13 in vibration and promotes the conveyance of cable grommets 2.

The function of versions of apparatus according to FIGS. 2 and 3 is similar to the apparatus 1a shown in FIG. 1. If the drive 10 is driven by the drive motor 11 via the drive roller 12, it also transmits the movement of the drive 10 to the conveyor 4 (in this case implemented by a chain). In this manner, the grommet receivers 6 are moved through the loose material container 3 and pick up the cable grommets 2 while passing through. These cable grommets 2 are moved upwards and then fall in the region of the upper dead centre point of the conveyor 4 onto the vibrator rail 13, and are subsequently transported by the vibrations thereof to the mounting location. There, they are mounted on a cable (not shown) by a grommet mounter tool 8.

Advantageously, the loose material container 3 and the conveyor arrangement 4,5,6 may form a subassembly. As a result, the conveyor arrangement 4,5,6 may be optimally adapted to the cable grommets 2 located in the respective loose material container 3. For example, round cable grommets 2 may require a different receiver 6 as opposed to rectangular cable grommets; likewise, thin cable grommets may require a different receiver 6 as opposed to thick cable grommets, etc. Preferably, therefore, loose material containers 3 provided with a specific type of cable grommet 2 are combined with a conveying arrangement 4,5,6 specifically adapted to these specific cable grommets 2. Advantageously, in this way, the loose material containers 3 do not need to be emptied when resetting a machine. In this manner, inadvertent combination of poorly matched components and resulting gaps in the conveyed stream associated therewith as well as the jamming of cable grommets 2 associated therewith, are also effectively avoided.

Considering this subassembly of the loose material container 3 and the conveyor assembly 4,5,6 further, it should be understood that the drive belt 10 and the drive motor 11 naturally may also be parts of this subassembly, so that when resetting the apparatus 1b, it is possible to dispense with a setup of the drive belt 10. It is also conceivable, however, for example, for the conveyor 4 to be driven via a friction wheel 5e,5f (see FIGS. 7 and 8). In such a variant, when resetting the apparatus, the conveyor 4 is also simply pressed against the friction wheel 5e,5f. Finally, the vibrator rail 13 along with its vibrator motor 14 may also be part of the aforementioned subassembly. In this manner, the conveying portion 7,13 may also be optimally adapted to the cable grommets 2 to be conveyed.

Figure 4:
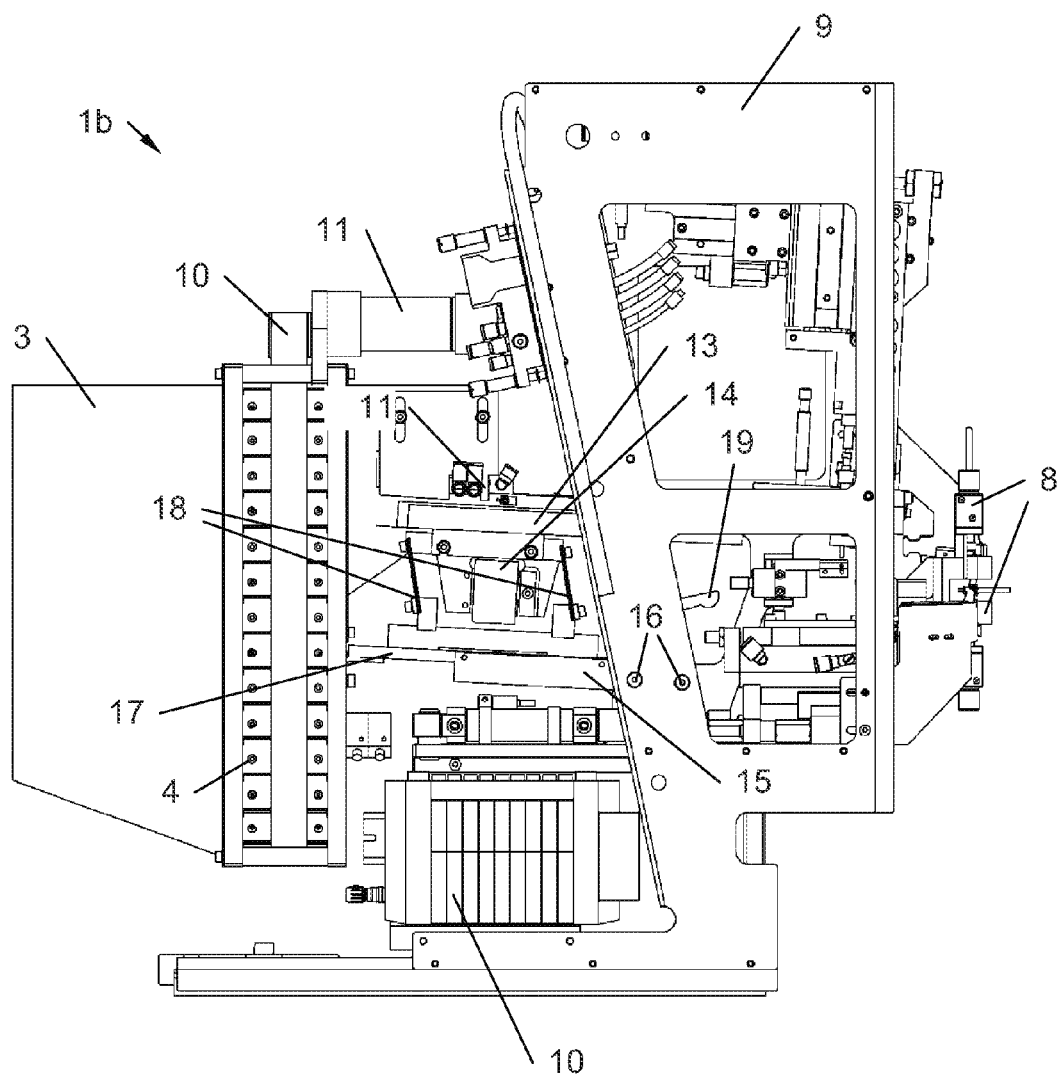

FIG. 4 depicts the cable grommet fitting apparatus 1b of FIGS. 2 and 3 in side view. In addition to the already described units, in this case an adapter plate 15 connected to the frame 9 by fitting screws 16 may be seen. The subassembly described above is fastened in this example to the frame 9 by its base plate 17 using a clamping lever 19, without a tool, via the adapter plate 15. The base plate 17 carries both the vibrator motor 14 (for example, an electromagnet acting as a linear motor) and the vibrator rail 13 mounted via springs 18. The conveyor 4, the rail in which the conveyor 4 is guided (alternatively or additionally to rollers corresponding to rollers 5 of FIG. 1), the drive 10, the motor 11, the drive roller 12, and the loose material container 3 are fastened via the base plate 17. The aforementioned clamping lever 19 facilitates handling and may preferably be provided on the outer side of the subassembly's side wall, but may also be located at its inner side. Instead of clamping lever 19, also a clamping screw offering the same functionality may be provided.

FIGS. 5-9 depict different exemplary variants of driving the conveyor. More specifically, in FIG. 5, a conveyor belt 4a, is driven via an internal drive roller 5a. The roller 5b is configured as a freewheeling roller. Naturally it is also conceivable for the roller 5b to be driven alternatively to the roller 5a or additionally thereto. It may also be clearly seen from FIG. 5 that the central region of the conveyor belt 4a is preferably free of rollers 5a, 5b due to the grommet receivers 6.

Considering FIG. 5 in more detail, the drive roller 5a is, in this example, configured as a friction roller and/or friction wheel. This drive roller is able to slip in the event of overload, so that damage to the drive motor or a gear mechanism located between the drive roller 5a and drive motor may be avoided.

FIG. 6 depicts a variant with a perforated conveyor belt 4b that is in engagement with the two drive rollers 5c, 5d configured as spiked rollers. Naturally, it is possible that only one of the rollers 5c, 5d may be configured as the drive roller, and in this case, the spikes of the freewheeling roller may then be dispensed with entirely or in part. Advantageously, in this variant a movement of the drive rollers 5c, 5d may be directly and specifically assigned to a movement of the conveyor belt 4b. This provides advantages if a position of the conveyor belt 4b is to be determined, for example, from the signal of a step motor or a rotation sensor. Furthermore, contamination of the drive rollers 5c, 5d or the conveyor belt 4b, even oil contamination, may not as easily cause a malfunction of the machine. In this variant, the contact forces of the rollers 5c, 5d on the conveyor belt 4b, when compared to those in a friction wheel drive, may advantageously also be reduced. The mounting of the rollers 5c, 5d may, therefore, be designed to be less robust. Also, smaller drive motors may be used due to the reduced bearing forces.

FIG. 7 depicts a variant of the invention in which the rollers 5, 5b, around which the conveyor belt 4a passes, are both configured as freewheeling rollers. The drive is implemented in this case via additional drive roller or rollers 5e arranged inside the ring formed by the conveyor belt 4a.

FIG. 8 depicts an arrangement very similar to that depicted in FIG. 7. In contrast therewith, external drive rollers 5f are provided instead of the drive rollers 5e located inside the conveyor belt 4a ring. This variant may provide advantages when resetting the machine, for example when a subassembly formed from the conveyor belt 4a and the rollers 5a,5b is simply pressed onto the drive roller 5e fixedly connected to the machine, when resetting the machine. Furthermore, as the outside of the ring is free of grommet receivers 6, it may be understood that wider, broader drive rollers 5f may be employed, and thus greater drive forces transmitted.

Figure 9:
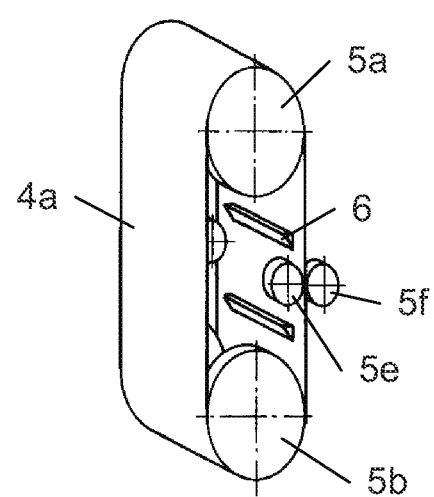

Finally, FIG. 9 depicts a variant wherein the two rollers 5e,5f are situated opposite one another. In this case, either the internal roller 5e or the external roller 5f may be driven. Alternatively or optionally, both rollers 5e,5f may also be driven. With this arrangement, high contact forces of the drive rollers 5e,5f may be applied to the conveyor belt 4a, and thus greater drive forces may be transmitted thereto. Compared to arrangements depicted in FIGS. 7 and 8, where the conveyor belt 4a is pressed against a guide rail at least in the region of the drive rollers 5e,5f, in the variant of FIG. 9 the frictional forces which cause losses may be reduced in this manner.

Figure 13:
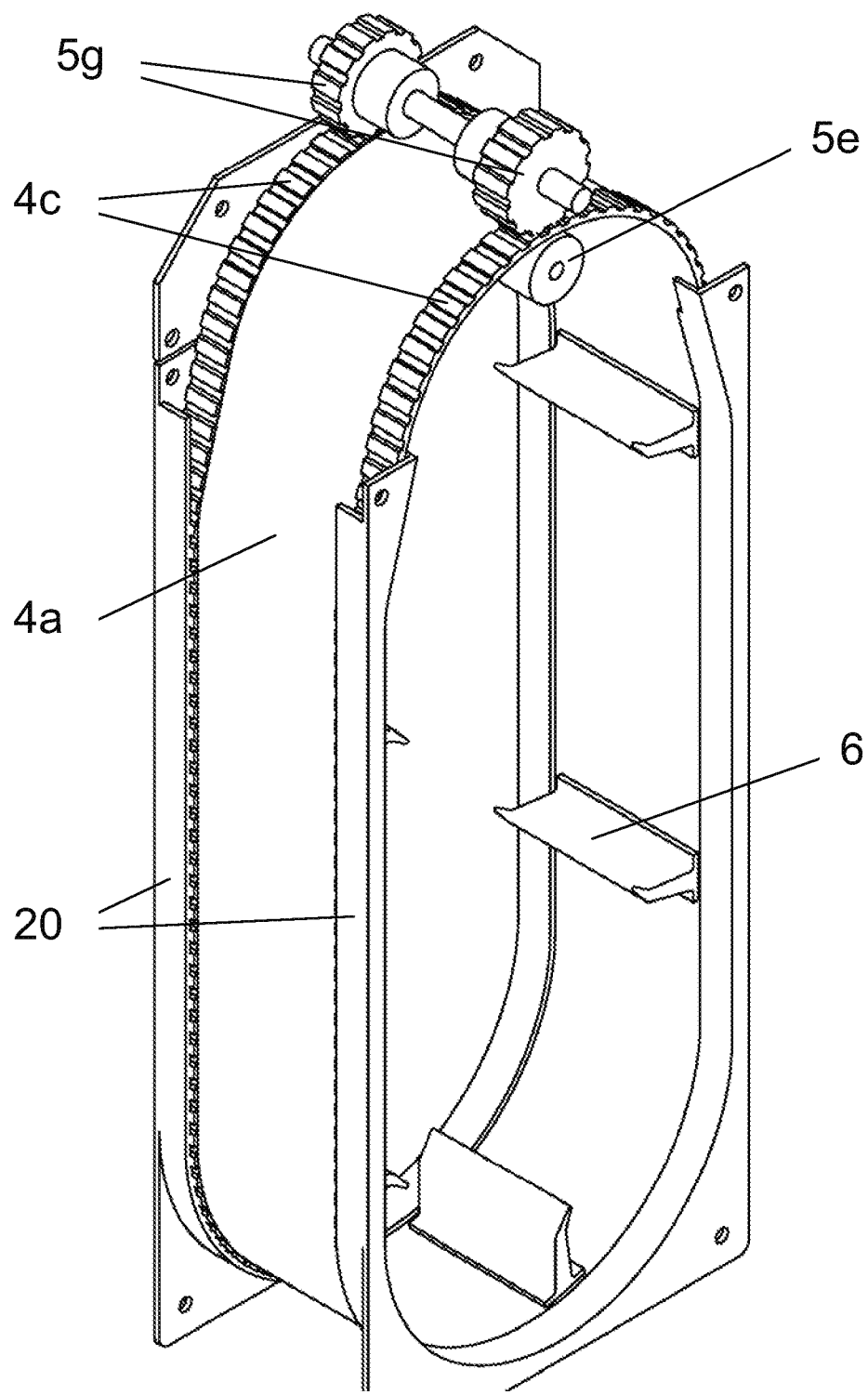

While the rollers 5e,5f in FIGS. 7-9 are depicted as friction rollers, it is also conceivable that these rollers be configured as spiked rollers. Generally, the positive drive connection may also be created via at least one gearwheel or sprocket 5g that engages in a toothed portion 4c of the conveyor belt 4a, as depicted in FIG. 13. In such variant, the conveyor belt 4a may be configured at least partially as a toothed belt (for example in the region analogous to where the conveyor belt 4b of FIG. 6 has the perforation, that is, on both edges of the belt 4a). Such gearwheel 5g may be arranged as the toothed portion of the conveyor outside, or even inside, the ring formed by the conveyor. Finally, it is also conceivable that the drive rollers 5a, 5b, 5e, 5f, 5g and/or the drive belt 4a are of lightweight construction, for example stamped, in order to improve the frictional connection.

Figure 14:
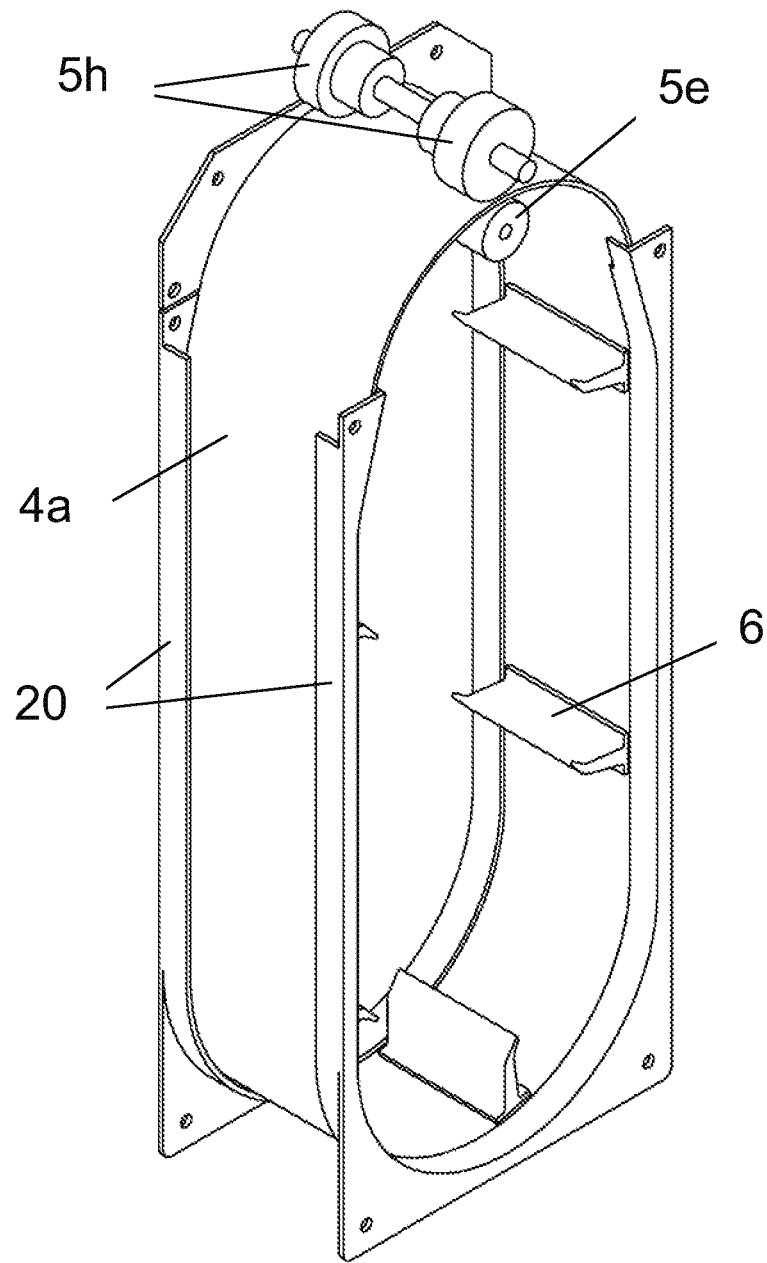

Further considering FIG. 13, the grommet receivers 6 are provided as blades connected to the belt 4a by any appropriate method, e.g. welded or glued. Guide rails 20 may be provided for the edges of the belt 4a or any other annular conveyor that may be employed, and define the geometrical shape of the annular conveyor 4 as well as stabilize the conveyor in the section with no drive rollers or counter-rollers. FIG. 14 depicts another version of a conveyor arrangement, with drive rollers 5h operatively interacting with the edge regions of conveying belt 4a, which is guided in guiding rails 20 as explained in connection with FIG. 13.

Figure 15:
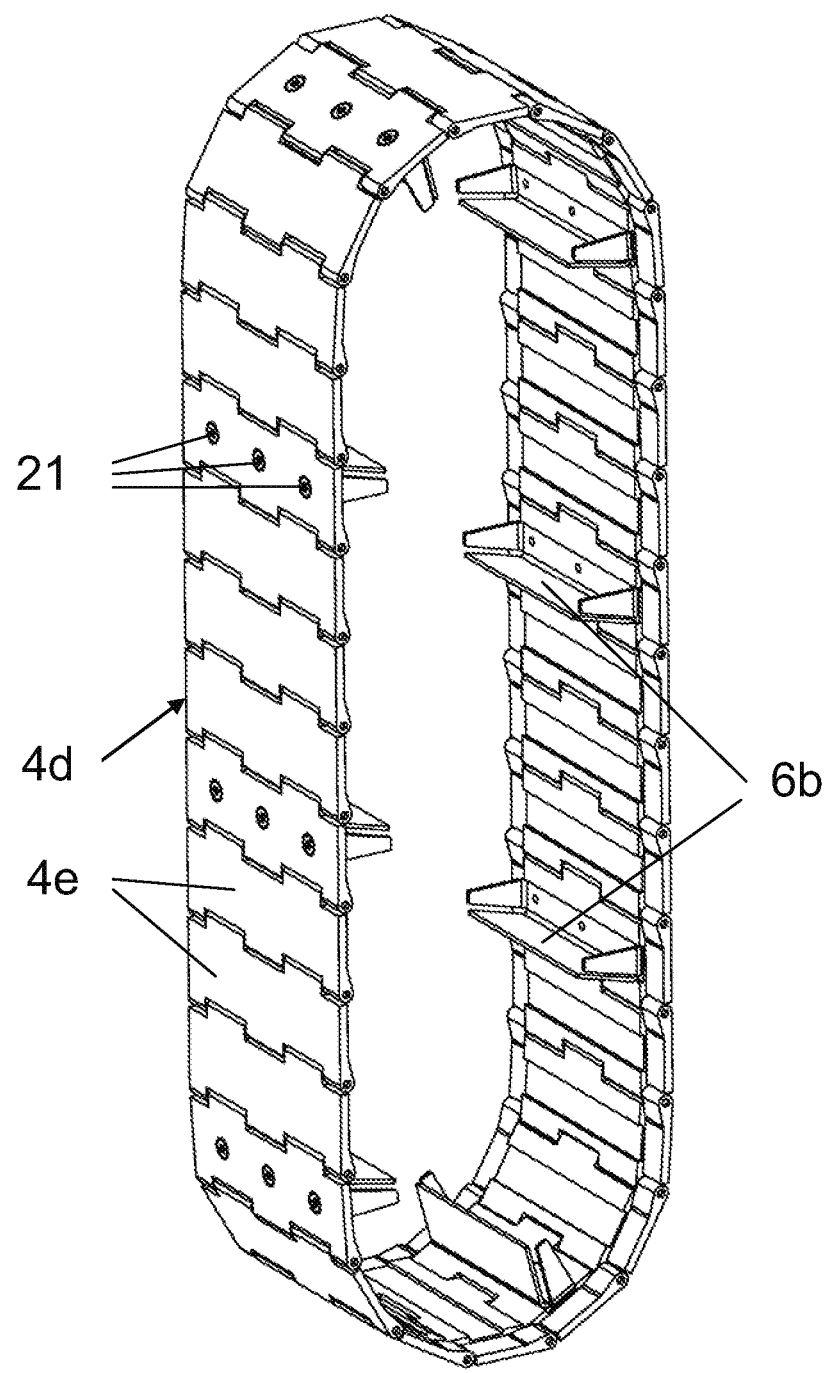
Figure 16:
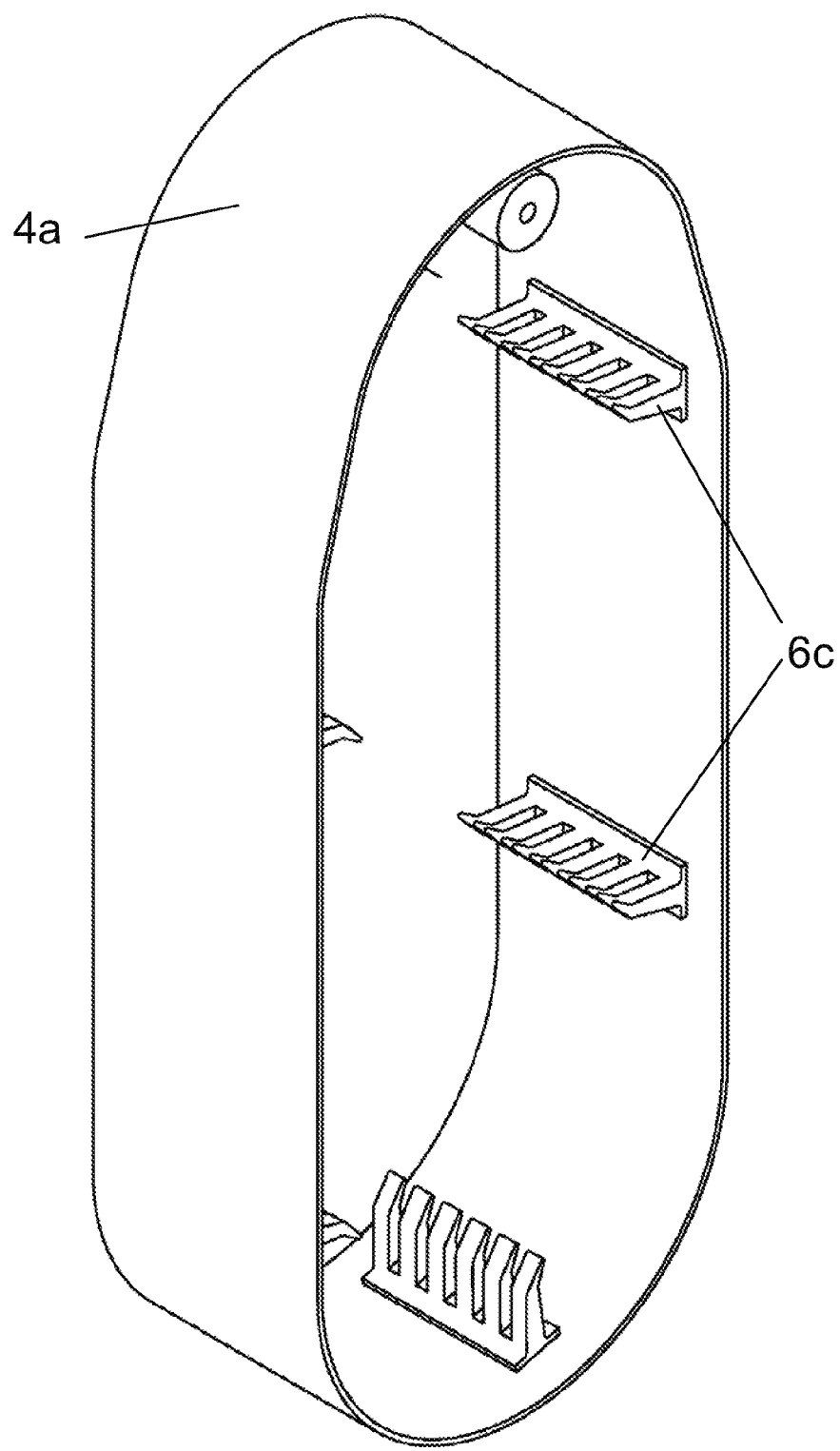

Another version of conveyor 4 is depicted in FIG. 15. Here, a closed chain 4d of pivotally connected elements 4e is provided as the annular conveyor 4. Onto some of the elements 4c, grommet receivers in form of plates 6b are mounted, for example by screws or rivets 21. Instead of plates 6b or blades 6, fork-like grommet receivers 6c as depicted in FIG. 16 might be provided. Instead of fastening the grommet receivers 6 ... 6c by screws or rivets 21, alternative fixation methods may be employed, for example gluing, welding, soldering, or the like.

Figure 10:
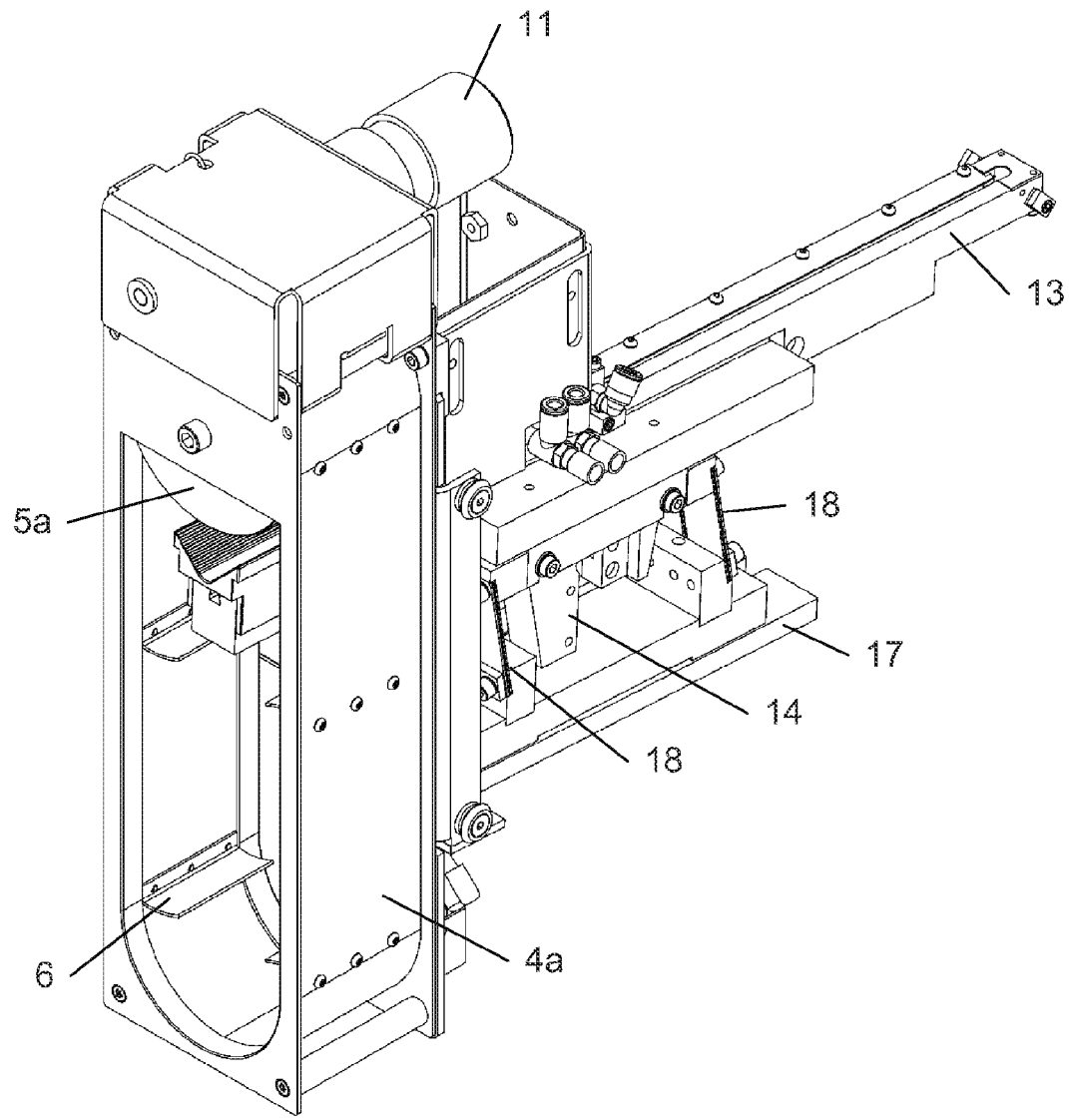
Figure 11:
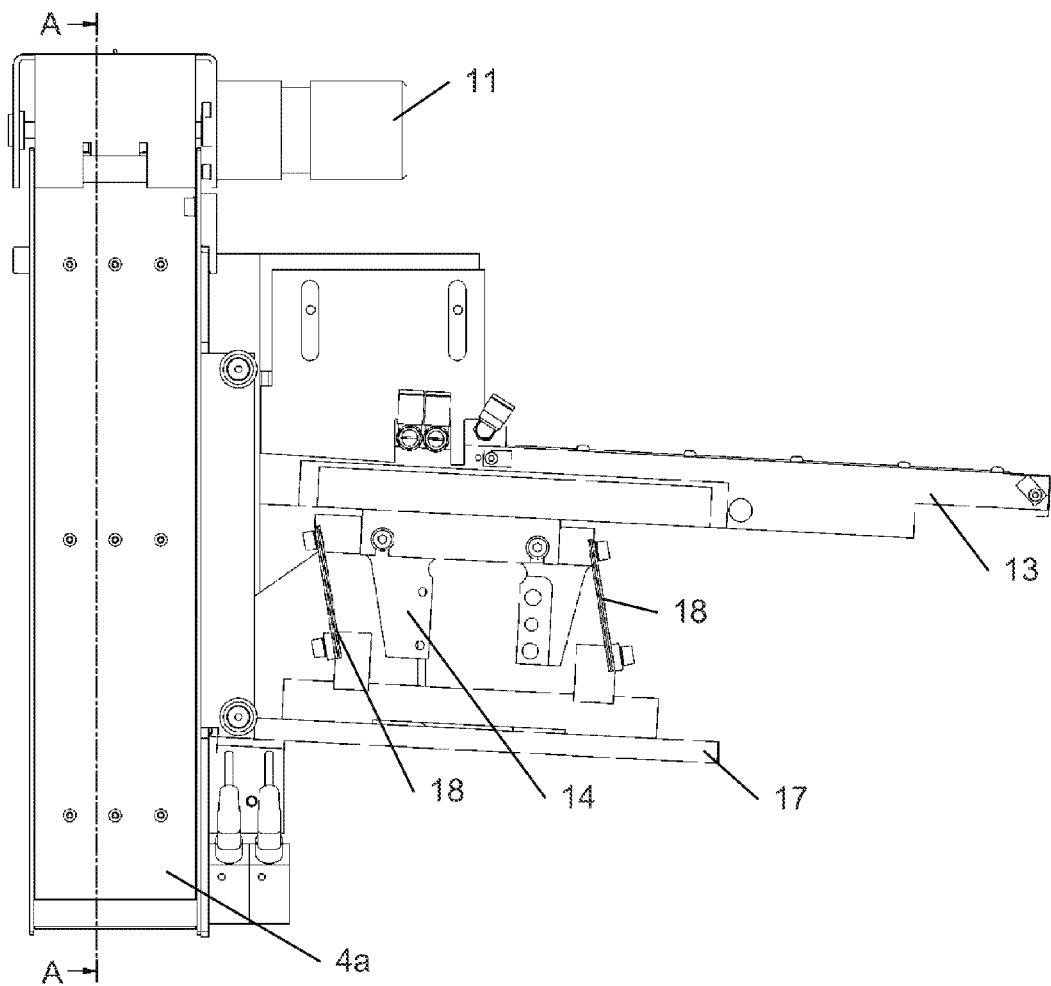
Figure 12:
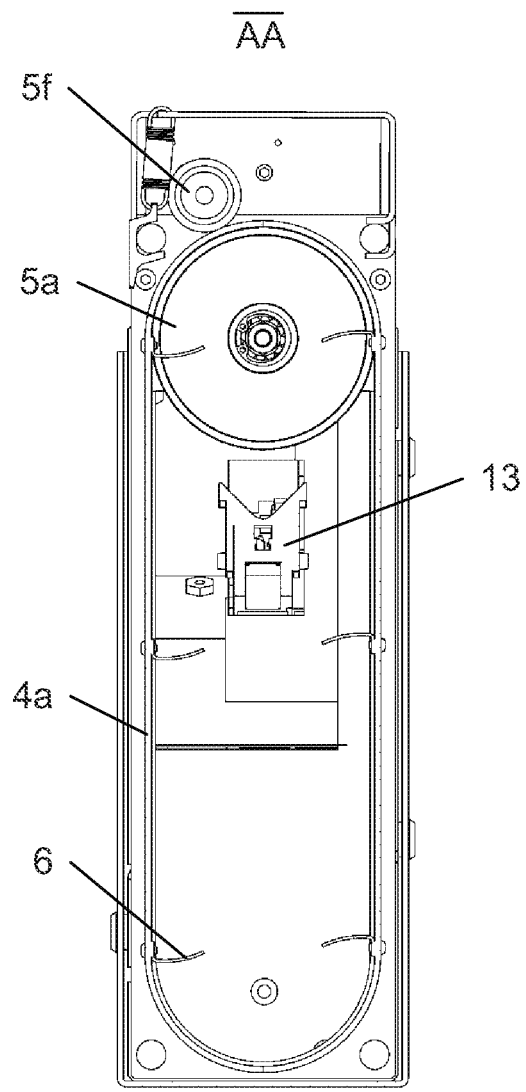

FIG. 10 depicts a subassembly of the cable grommet fitting apparatus 1b, obliquely from the rear, as an actual module comprising a continuous, annular conveyor 4a cooperating with a loose material container (not here shown) with grommet receivers 6 for receiving the cable grommets 2. FIG. 11 similarly depicts this subassembly in side view, while FIG. 12 depicts it in sectional view. As depicted, the receivers 6 are formed in this example by plates and/or blades that are riveted to the conveyor 4a formed by a rubber belt. At the upper end of the ring formed by the rubber belt 4a, there is a roller 5a around which the rubber belt 4a is guided and against which a drive roller 5f, FIG. 12, acting on the rubber belt 4a presses. This drive roller 5f is driven by a motor 11 (FIG. 11). At the lower end of the ring formed by the rubber belt 4a is located a guide rail, on which the rubber belt 4a is guided. Alternatively or additionally, it is conceivable that at the lower end of the ring a roller could be arranged, so that the rubber belt 4a is guided around this additional roller. The subassembly further includes a vibrator rail 13, a vibrator motor 14, a base plate 17, as well as two springs 18. The function of these enumerated components is the same as the function of the similarly-enumerated components of the apparatus 1b depicted in FIGS. 2-4.

Figure 17:
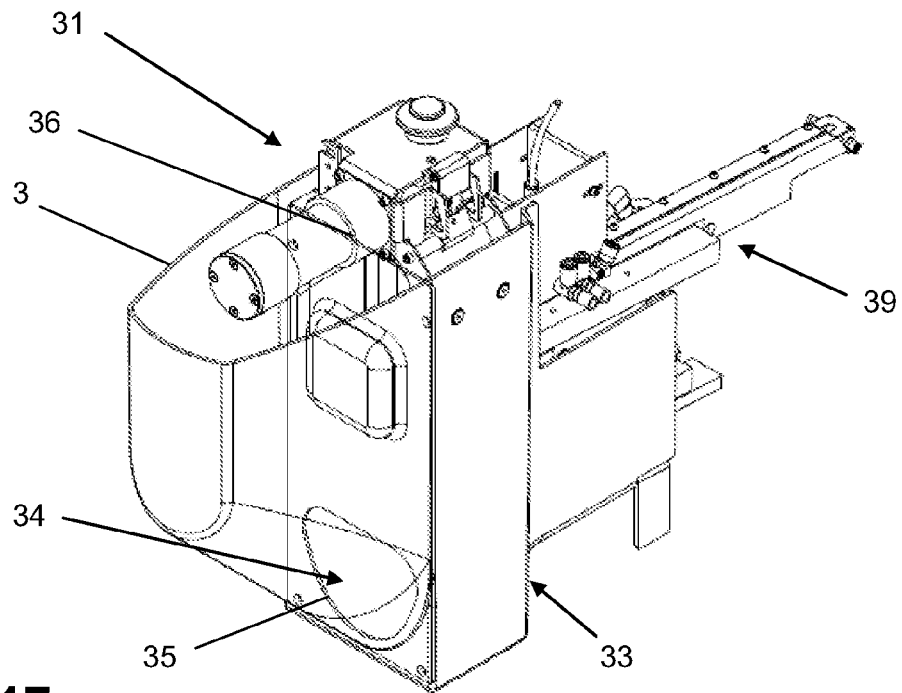
FIG. 17 depicts a version of the device in a perspective view.

FIG. 17 depicts a simplified schematic representation of a portion of a form of version of apparatus for the attachment of cable bushings (not represented) to a cable (not represented). The apparatus 31 for separation and conveyance of cable sleeves includes the bulk material container 3 accommodating a plurality of loose cable sleeves, and a conveyor system 33 for conveying the loose cable sleeves, preferably located in the bulk material container 3, to a downstream separation and transportation system 39. With reference to the earlier description, such a separation and transportation system 39 may encompass the aforementioned conveying portion.

The cable sleeves could alternatively also be brought into the region of the conveyor system 33 by means of additional conveyor systems (not represented in drawings, for example conveyor belts, screw conveyors, etc.). In these cases, the bulk material container 3, as may also be seen and understood in FIG. 18, may be dispensed with.

In order, even with a high number of cable sleeves in the region of the conveyor system 33, to prevent its overload or malfunction, for example as a result of blockage or jamming, a cross-sectional constriction 35 is provided in the transition region passage 34 to the conveyor system 3. For the purpose of optimising its effect, this cross-sectional constriction 35 may be matched to the size and geometry of the cable sleeves supplied to the conveyor system 33 or accommodated in the bulk material container 3, as the case may be, in each particular implementation.

Figure 18:
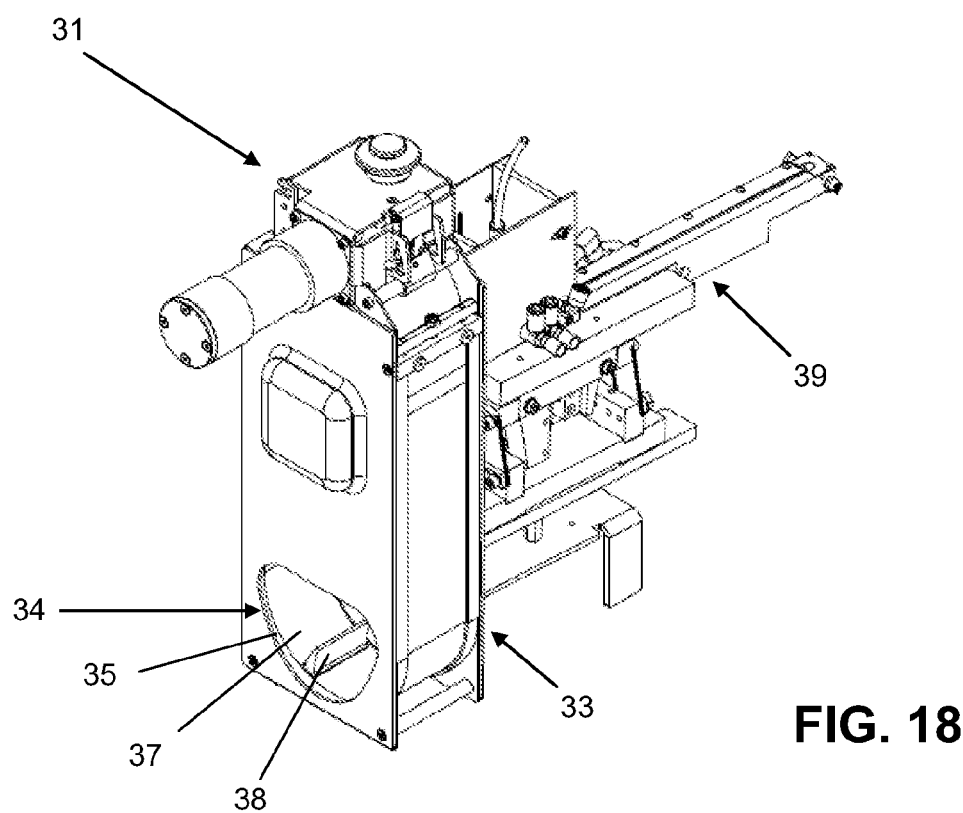
FIG. 18 depicts a further, simplified form in a view that is analogous to FIG. 17.

For a version with a separate bulk material container 3 that may be connected to the conveyor system 33, or embodied with at least the conveyor system 33 as a structural unit, as represented in FIG. 18, the cross-sectional constriction 35 is designed as an opening for the cable sleeves to pass into the region of the conveyor system 33. Here, in order that a view into the transition passage region 34 and the sorting region at the start of the separation and transportation system 39 be ensured, the separator 36 or separating wall between bulk material container 3 and conveyor system 33 may be embodied as transparent. If so required, the whole container 3 may also be embodied in a transparent manner, in order facilitate checking its fill state and/or the type of cable sleeves contained therein.

As can also be seen from both FIGS. 17-18, the cross-sectional constriction 35, or opening, is located underneath the maximum possible fill height of cable sleeves within the bulk material container 3, so as to prevent a blockage or an overload of the conveyor system 33, even in the event of an even higher fill level of the bulk material container 3. Here, the cross-sectional constriction 35, or opening, may be located flush with the floor, i.e. the deepest section of the bulk material container 3.

The bulk material container 3 with at least the conveyor system 33, preferably with the whole apparatus 31, may form a structural unit. This also serves to provide process security, since no bulk material container 33 laden with incorrect cable sleeves may be connected. On the other hand, an empty container 3 may be exchanged with a prefilled container in a simple and rapid manner, in order to keep any interruptions to production as short as possible and at the same time to reduce the work and time required for manual filling. For this last described form of version including a separate bulk material container 3, it may be advantageous if the cross-sectional constriction, or opening 35, in the separator 36 or separating wall be embodied such that it may be controllably closed.

A processing facility for which the apparatus 31, in the same manner as a sleeve assembly unit fitted downstream of the apparatus 31, represents a component part in each case, is usually covered with a hood. The apparatus 31 itself typically has a cover (not represented in drawings) overlapping both the bulk material container 33 and also the conveyor system 3; the cover then also preferably has an opening for the refilling of the cable sleeves. When processing small cable sleeves, which are typically manipulated using compressed air, such a cover prevents, for example, the sleeves from being blown out of the bulk material container 3. Since, during the refilling, the hood of the processing facility must be opened and the latter must be halted for this purpose, the refill time and the refill interval, which becomes shorter with the size of the cable sleeves, reduce the production capacity. Accordingly, a tube may be provided, directed through the hood of the processing facility and also through the opening of the cover of the apparatus 31, into the bulk material container 3. In this manner, the latter may be refilled via the said tube without halting of the processing facility, and thus without any interruption of production.

The cross-sectional constriction 35, i.e. the version of the bulk material container 3 explained in conjunction with FIG. 18, having a separator 36 and a therein provided opening, is preferably combined as a cross-sectional constriction 35 with a conveyor system 33, that includes an endless, loop-form conveyor loop 37 with a receiver 38 provided thereon for accommodation of the cable sleeves. The conveyor loop 37 communicates with the region of the bulk material container 3 that is filled with cable sleeves. As also represented in FIG. 17, the exemplary receivers 38 are typically arranged on the inner face of the conveyor loop 37, in a manner previously described.

Here, an advantageous form of version envisages that at least one roller be arranged on the inner face of the conveyor loop 37, around which the conveyor loop 37 is guided. This can for example act as a counter-roller to a drive roller, pressing externally onto the conveyor loop 37.

It is also advantageous if a horizontal or inclined section of the separation and transportation system 39 projecting into the interior of the conveyor loop 37 be provided, for example a chute or a conveyor rail set at a slight inclination relative to the horizontal. In such versions, the cable sleeves fall in the region of the upper dead point of the conveyor loop 37 from the accommodators 38 onto this projecting section of the separation and transportation system 39, and they are transported by the latter in a sorted and separated formation to the assembly station of the sleeve mounting tool 8.

As has been indicated, the variants explicitly set forth only represent a proportion of the many possibilities for the invention and should not be used to limit the field of application of the invention. For the person skilled in the art, it should be straightforward to adapt the invention to requirements, based on the considerations shown here, without departing from the protected scope of the invention. Moreover, it is emphasized that elements of the arrangements represented in the drawings figures may also form the basis for independent inventions. It should also be understood in the context of the preceding discussion that the present invention is not limited in any manner to the described and drawings-depicted implementations, but may be realized in many forms and dimensions without abandoning the region of protection of the invention. For example, in implementations of the invention the materials that may be employed and also, as well, the dimensions of particular elements, may be according to the demands of a particular construction. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques and structures described and illustrated herein should be understood to be illustrative and exemplary, and not necessarily limiting upon the scope. The scope of the present invention is defined by the appended claims, including known equivalents and unforeseeable equivalents at the time of filing of this application.

LIST OF REFERENCE LABELS 1a, 1b cable grommet fitting apparatus
2 cable grommet
3 bulk loose material container
4, 4a, 4b conveyor belt
4c toothed section of conveyor
4d conveyor chain
4e element of conveyor chain
5, 5a ... 5f, 5h roller
5g sprocket
6 grommet receiver (blade)
6a grommet receiver (plate)
6c grommet receiver (fork)
7 slide
8 grommet mounter, mounting tool
9 frame
10 drive (belt)
11 drive motor
12 drive roller for drive
13 vibrator rail
14 vibrator motor (electromagnetic)
15 adapter plate
16 fitting screw
17 base plate
18 spring
19 clamping lever
20 guide rails
21 screws or rivets
31 apparatus for separation and conveyance of cable sleeves
33 conveyor system
34 transition region passage to the conveyor system
35 cross-sectional constriction, or opening
36 separator
37 conveyor loop
38 cable sleeve accommodator/receiver
39 separation and transportation system

What is claimed is:
1. A cable sleeve fitting apparatus comprising:
a cable sleeve container configured to receive loose sleeves;
a conveyor system configured to convey cable sleeves from said cable sleeve container, said conveyor system including a driven endless conveyor loop;
at least one cable sleeve receiver, said at least one cable sleeve receiver being arranged on an inner face of said conveyor loop;
a cable sleeve transporter configured to receive, from said conveyor loop, cable sleeves conveyed by said conveyor loop from said container; and,
a transition passage between said container and said conveyor system, said transition passage forming a cross- sectional constriction to cable sleeve transport provided between said container and said conveyor system.

2. A cable sleeve fitting apparatus as claimed in claim 1, further comprising:
a separator between said loose material container and said conveyor system, said separator having an opening forming said transition passage.

3. The cable sleeve fitting apparatus as claimed in claim 2, wherein:
said separator is transparent.

4. A cable sleeve fitting apparatus as claimed in claim 1, further comprising:
said container having a maximum fill height for cable sleeves; and,
said transition passage cross-sectional constriction being located beneath said maximum fill height.

5. A cable sleeve fitting apparatus as claimed in claim 4, further comprising:
a floor portion in said container, said floor portion encompassing the deepest section of said container;
said opening having a lower edge, and said opening lower edge is located on said floor portion.

6. The cable sleeve fitting apparatus as claimed in claim 1, wherein:
said container and said conveyor system form a structural unit.

7. The cable sleeve fitting apparatus as claimed in claim 1, wherein:
said container is a separable component coupled to said conveyor system.

8. The cable sleeve fitting apparatus as claimed in claim 7, wherein:
said opening is selectively closable.

9. A cable sleeve fitting apparatus as claimed in claim 1, further comprising:
said cable sleeve transporter includes a section projecting into the interior of said conveyor loop.

10. A cable sleeve fitting apparatus as claimed in claim 1, further comprising:
at least one roller arranged on said inner face of said conveyor loop, around which said conveyor loop is guided.

11. A cable sleeve conveyor system separation device comprising:
a loose material container configured to hold cable sleeves;
a conveyor system configured to convey cable sleeves from said container;
a cable sleeve transporter configured to receive from said conveyor system cable sleeves conveyed by said conveyor system from said container; and,
a transition passage between said container and said conveyor system, said transition passage forming a cross-sectional constriction to cable sleeve transport provided between said container and said conveyor system.

12. A cable sleeve conveyor system separation device as claimed in claim 11, further comprising:
a separator between said loose material container and said conveyor system, said separator having an opening forming said transition passage.

13. The cable sleeve conveyor system separation device as claimed in claim 12, wherein:
said separator is transparent.

14. A cable sleeve conveyor system separation device as claimed in claim 11, further comprising:
said container having a maximum fill height for cable sleeves; and,
said transition passage cross-sectional constriction being located beneath said maximum fill height.

15. A cable sleeve conveyor system separation device as claimed in claim 14, further comprising:
a floor portion in said container, said floor portion encompassing the deepest section of said container;
said opening having a lower edge, and said opening lower edge is located on said floor portion.

16. The cable sleeve conveyor system separation device as claimed in claim 11, wherein:
said container and said conveyor system form a structural unit.

17. The cable sleeve conveyor system separation device as claimed in claim 11, wherein:
said container is a separable component coupled to said conveyor system.

18. The cable sleeve conveyor system separation device as claimed in claim 17, wherein:
said opening is selectively closable.

19. A cable sleeve fitting apparatus comprising:
a cable sleeve container configured to receive loose sleeves, said cable sleeve container having at least one opening;
a conveyor configured to supply sleeves from said container via said at least one opening in said cable sleeve container, said conveyor including a driven flexible annular loop member;
at least one sleeve receiver, said at least one sleeve receiver being arranged on an inner radius of said flexible annular loop member;
a second cable sleeve conveyor extending into said flexible annular loop member; and,
a sleeve mounter configured to mount cable sleeves onto cable, said sleeve mounter being situated at a sleeve mounting location to receive sleeves supplied by said second cable sleeve conveyor.

20. The cable sleeve fitting apparatus as claimed in claim 19 wherein:
said second cable sleeve conveyor is selected as at least one of the group consisting of a slide, a conveyor belt, and a vibrator.

* * * * *